Sept. 10, 1929.  E. R. FITCH  1,727,371
SAFETY CAR CONTROL EQUIPMENT
Filed Feb. 14, 1928
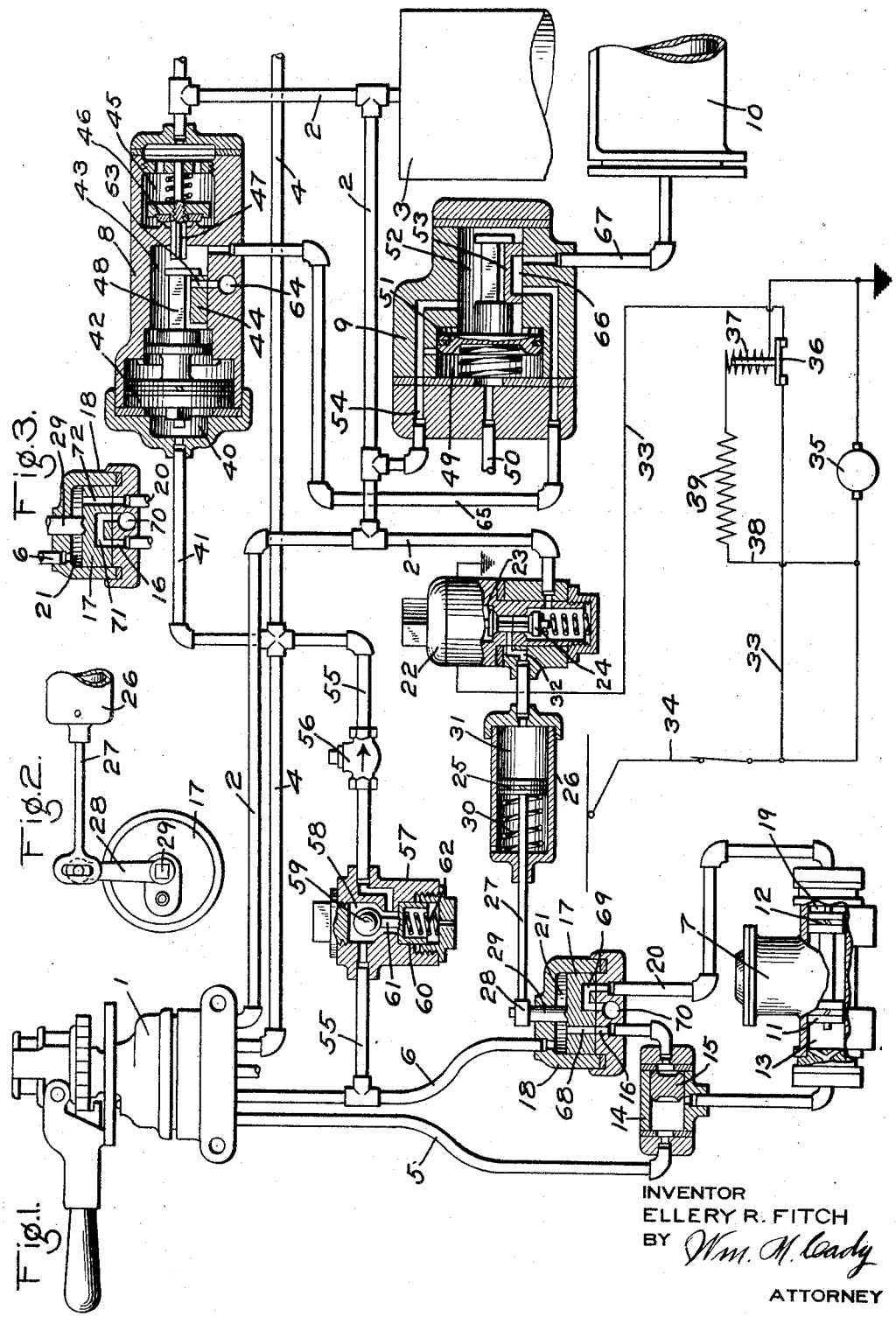
INVENTOR
ELLERY R. FITCH
BY Wm. M. Cady
ATTORNEY Patented Sept. 10, 1929.

1,727,371

UNITED STATES PATENT OFFICE.

ELLERY R. FITCH, OF WESTWOOD, NEW JERSEY, ASSIGNOR TO WESTINGHOUSE AIR BRAKE COMPANY, OF WILMERDING, PENNSYLVANIA, A CORPORATION OF PENNSYLVANIA.

SAFETY CAR-CONTROL EQUIPMENT.

Application filed February 14, 1928. Serial No. 254,195.

This invention relates to a fluid pressure apparatus for controlling the brakes and the car doors.

It has heretofore been proposed to provide a car door and brake controlling equipment comprising a brake valve device having a door opening position in which fluid under pressure is supplied to apply the brakes and is also supplied to a door engine to effect the opening of the car doors.

With the above equipment, the brake cylinder pressure will build up to the full pressure carried in the main reservoir if the brake valve is left in the door open position, and in order to avoid this and prevent the unnecessary waste of fluid under pressure, it has also been proposed to provide means for limiting the pressure of fluid supplied to the brake cylinder in the door open position of the brake valve. The brake valve device of this equipment is also provided with another position for applying the brakes without opening the car doors and in which the pressure in the brake cylinder may be built up as desired to the limit of pressure carried in the main reservoir.

In order to avoid a rough stop, it is necessary that the operator apply the brakes and then graduate the pressure down as the train approaches a stop and then in order to open the car doors, it is necessary to move the brake valve handle to the door open position after the car has actually been brought to a stop and in this position fluid under pressure is again supplied to the brake cylinder up to the pressure of the pressure limiting device.

According to the principal object of my invention, means are provided by which the brakes may be applied in the door open position of the brake valve without opening the car doors unless the speed of the car has been reduced to a low degree such that the car is practically at a stop.

In the accompanying drawing; Fig. 1 is a diagrammatic view, partly in section, of a car door and brake controlling equipment embodying my invention; Fig. 2 a plan view of a portion of the door controlling means; and Fig. 3 a section of the door controlling valve device, showing same in its door opening position.

As shown in the drawing, the equipment may comprise a brake valve device 1 having connections to a main reservoir pipe 2, leading to the usual main reservoir 3, a straight air pipe 4, a door closing pipe 5, and a door opening pipe 6 and with a double end equipment, a similar brake valve device with the same pipe connections is provided at each end of the car. Each car of a double end equipment is also provided with a door engine 7 at each end of the car.

Each car is also provided with a relay brake controlling valve device 8, an emergency valve device 9 and a brake cylinder 10.

Each door engine may comprise a casing containing connected pistons 11 and 12, the movement of the pistons to the right being adapted to effect the closure of car doors and the movement to the left, the opening of the car doors.

The piston chamber 13 of piston 11 is connected by way of a double check valve device 14 with the door closing pipe 5. The double check valve 15 in the casing of the device 14 is adapted in the position shown to connect pipe 5 with piston chamber 13. In the opposite position, piston chamber 13 is connected to a passage 16 leading to the seat of a rotary valve 17 contained in a casing 18 of a door controlling valve device. The piston chamber 19 of piston 12 is connected through pipe 20 to the seat of the rotary valve 17 and the rotary valve chamber 21 is connected to the door opening pipe 6.

The means for operating the rotary valve 17 comprises a magnet 22, double beat valves 23 and 24 adapted to be operated by said magnet, and a piston 25 contained in a cylinder 26 and having a stem 27 which is connected through an arm 28 with the stem 29 of the rotary valve.

A spring 30 acts on one side of the piston 24 and urges said piston toward the right and piston chamber 31 at the opposite side of the piston is connected to a passage 32 leading to a space intermediate the valves 23 and 24.

The circuit wire 33 of the magnet 22 is connected to current supply wire 34 which supplies current to the usual car motor 35 and for opening and closing the circuit through the wire 33 a switch device is provided comprising a switch member 36 which is controlled by a relay coil 37 disposed in a shunt circuit 38 around the motor 35, said circuit containing a suitable resistance coil 39.

The relay valve device 8 comprises a casing having a piston chamber 40 connected to pipe 41 leading to pipe 4, and containing a piston 42, a valve chamber 43 containing a slide valve 44 adapted to be operated by piston 42, and a valve chamber 45 containing a valve 46 having a stem 47 adapted to be operated by the stem 48 of piston 42.

The emergency valve device 9 comprises a casing having a piston chamber 49 connected to brake pipe 50 and containing a piston 51 and a valve chamber 52 containing a slide valve 53 adapted to be operated by said piston, the valve chamber 52 being connected through passage 54 with the main reservoir pipe 2.

A pipe 55 connects pipe 6 with pipes 4 and 41 and interposed in said pipes is a non-return check valve 56 and a pressure limiting valve device 57, comprising a casing having a valve chamber 58 containing a ball check valve 59 and connected to the pipe 6 at the brake valve side. A piston 60 having a stem 61 adapted to engage the valve 59 is mounted in the casing and is subject to the pressure of a spring 62.

In operation, with the brake valve 1 in release position, pipe 4 is connected to the atmosphere, and piston chamber 40 being at atmospheric pressure, the piston 42 will be in its left hand position, as shown in the drawing, with valve 44 connecting port 63 with exhaust port 64. The brake pipe 50 being charged with fluid under pressure, piston 51 of the emergency valve device 9 will be held in release position, and slide valve 53 will connect pipe 65 through cavity 66, with brake cylinder pipe 67.

Pipe 65 opens in valve chamber 43, so that in the release position of the parts, as above described, the brake cylinder 10 is connected to exhaust port 64.

With the car running along the road, the relay coil 37 is energized by current supplied to the car motor 35, so that the switch member 36 closes the circuit through wire 33 and energizes magnet 22.

Magnet 22 being energized, the valve 23 will be held seated and valve 24 will be unseated, so that fluid under pressure is supplied from the main reservoir pipe 2 to piston chamber 31. Piston 25 is then held in its left hand position, as shown in the drawing, and the rotary valve 17 is held in the position shown in Fig. 1, in which a port 68 in the rotary valve registers with passage 16, while pipe 20 is connected, through cavity 69 with exhaust port 70.

The door opening pipe 20 is thus connected to the exhaust, while in the release position of the brake valve device, the door closing pipe 5 is supplied with fluid under pressure, which flows past the double check valve 15 to piston chamber 13 of the door engine 7 and thereby the pistons 11 and 12 are held in position for maintaining the car doors closed.

If it is desired to apply the brakes so as to bring the car to a stop, the brake valve 1 may be moved to doors open brake applied position, in which fluid under pressure is supplied to pipe 6 and thence to pipe 55.

Fluid under pressure flows past the open valve 59 and the check valve 56 to piston chamber 40 and piston 42 is thereby shifted to the right, first moving the release valve 44 to close off the exhaust port 64 from valve chamber 43 and then operating to unseat valve 46, so that fluid is supplied from the main reservoir 3 to pipe 65. Fluid supplied to pipe 65 flows to the brake cylinder through cavity 66 in the emergency slide valve 53.

When the pressure of fluid flowing through pipe 55 has been increased to a predetermined degree, the pressure acting on piston 60 of the pressure limiting valve device operates to permit the check valve 59 to seat and thus cut off the further flow of fluid to the brake cylinder.

When the car is being brought to a stop, the usual motor controller is moved to off position, so as to cut off the supply of current to the car motor 35, but the relay coil 37 will still remain energized by the counter-electro-motive force of the car motor, so long as the car is running at an appreciable speed.

It will thus be seen that the magnet 22 remains energized while the car is being brought to a stop and piston 25 is maintained in the position shown, so that while fluid under pressure is supplied to the door opening pipe 6 when the brakes are applied, as above described, the car doors will not be opened, since the rotary valve 17 is in a position in which pipe 6 and valve chamber 21 are connected through port 68 with the double check valve 15. The double check valve is consequently shifted to its left hand position, since the door closing pipe 5, opening to the opposite side of the double check valve is subject to atmospheric pressure when the brake valve device is in brake applying positon. The car doors are therefore held closed at this time.

When the speed of the car has been reduced substantially to zero, the counter-electro-motive force of the car motor will not be sufficient to energize the magnet 22, so that the double beat valve 24 will be shifted to its seat, while valve 23 will be unseated. Fluid under pressure will then be vented from piston chamber 31, so that spring 30 shifts piston 25 to the right. The valve 17 is thereby rotated to the position shown in Fig. 3, in which passage 16 is connected to exhaust port 70 through cavity 71, while pipe 20 is connected to valve chamber 21 and door opening pipe 6 through port 72 in the rotary valve 17. The door opening piston 12 of the door engine 7 is therefore subjected to fluid pressure, while the door closing piston is subject to atmospheric pressure and consequently the door engine is operated to effect the opening of the car doors, but only when the car has been practically brought to a stop.

By providing means for supplying fluid under pressure to the door engine on the door closing side through the rotary valve 17, the door engine is prevented from being subjected on opposite sides to atmospheric pressure at a time when the brakes are applied and the car is running along the road. If such were the case, then the door engine would be balanced as to fluid pressure, so that the door might be opened by a passenger or other person under the above conditions, which would not be desirable.

With my invention applied, the doors can only be opened when the car is brought to a stop and then the only limited pressure in the brake cylinder is determined by the limiting valve device 57, which prevents any tendency to rough handling.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a vehicle controlling apparatus, the combination with a door engine operated by fluid under pressure for effecting the opening and closing of a car door, of a brake valve device having a door opening pipe through which fluid under pressure is supplied to said door engine to effect the opening of the car door, a valve for controlling communication from said pipe to the door engine, and means controlled by the speed of the vehicle for controlling the operation of said valve.

2. In a controlling apparatus for a motor driven vehicle, the combination with mechanism for controlling a vehicle door, of means for operating said mechanism to effect the opening of a vehicle door, and means for preventing the operation of said mechanism by said operating means to open the vehicle door, including an electrically controlled device having its circuit controlled according to the counter-electro-motive force of the vehicle motor.

3. In a controlling apparatus for a motor driven vehicle, the combination with a fluid pressure operated door engine for controlling the opening and closing of a vehicle door, and means for controlling communication through which fluid under pressure is supplied for controlling the door engine including an electrically controlled device, a switch controlling the circuit of said electrically controlled device, and electrically controlled means in a shunt circuit around the vehicle motor for controlling the operation of said switch.

4. In a controlling apparatus for a motor driven vehicle, the combination with mechanism for controlling the vehicle doors, of means for preventing the operation of said mechanism to open the car doors unless the brakes have been applied and unless the speed of the vehicle has been reduced to such a point that the vehicle is substantially at a stop.

5. In a controlling apparatus for a motor driven vehicle, the combination with mechanism for controlling the vehicle doors, of means for applying the brakes, means for operating said mechanism to open the vehicle doors when the brakes are applied, and means for preventing the operation of said mechanism to open the vehicle doors when the brakes are applied, unless the speed of the vehicle has been reduced to a low speed.

6. In a controlling apparatus for a motor driven vehicle, the combination with a fluid pressure operated door engine, of a brake valve device, a door closing pipe through which fluid under pressure is supplied by said brake valve device to said door engine, a door opening pipe through which fluid under pressure is supplied by said brake valve device to said door engine, a valve for controlling communication from said brake valve device through said door opening pipe to the door engine, and means for operating said valve to cut off said communication unless the vehicle is practically at a stop.

7. In a controlling apparatus for a motor driven vehicle, the combination with a fluid pressure operated door engine, of a brake valve device, a door closing pipe through which fluid under pressure is supplied by said brake valve device to said door engine, a door opening pipe through which fluid under pressure is supplied by said brake valve device to said door engine, a valve having one position for connecting the door opening pipe with the door opening side of said door engine and another position for connecting the door opening pipe with the door closing side of said door engine, and means operative while the vehicle is running for holding said valve in the second mentioned position.

8. In a controlling apparatus for a motor driven vehicle, the combination with a fluid pressure operated door engine, of a brake valve device, a door closing pipe through which fluid under pressure is supplied by said brake valve device to said door engine, a door opening pipe through which fluid under pressure is supplied by said brake valve device to said door engine, a valve having one position for connecting the door opening pipe with the door opening side of said door engine and another position for connecting the door opening pipe with the door closing side of said door engine, and means operative while the vehicle is running for holding said valve in the second mentioned position and adapted when the vehicle is brought substantially to a stop to move said valve to its first mentioned position.

9. In a controlling apparatus for a motor driven vehicle, the combination with a fluid pressure operated door engine, of a brake valve device, a door closing pipe through which fluid under pressure is supplied by said brake valve device to said door engine, a door opening pipe through which fluid under pressure is supplied by said brake valve device to said door engine, a valve having one position for connecting the door opening pipe to the door opening side of said door engine and the door closing side of said door engine with the atmosphere and another position for connecting the door opening pipe with the atmosphere and the door closing pipe to the door closing side of the door engine, and means controlled according as the vehicle is running or substantially at a stop for operating said valve.

10. In a controlling apparatus for a motor driven vehicle, the combination with a fluid pressure operated door engine, of a brake valve device, a door closing pipe through which fluid under pressure is supplied by said brake valve device to said door engine, a door opening pipe through which fluid under pressure is supplied by said brake valve device to said door engine, a valve having one position for connecting the door opening pipe with the door opening side of the door engine and another position for connecting the door opening pipe with the door closing side of the door engine, means for operating said valve, and a double check valve for controlling communication from the door closing pipe and from the door opening pipe to the door closing side of said door engine.

In testimony whereof I have hereunto set my hand.

ELLERY R. FITCH.